(12) United States Patent
Smith

(10) Patent No.: US 6,643,253 B1
(45) Date of Patent: Nov. 4, 2003

(54) METHOD AND APPARATUS FOR PROVIDING VIRTUAL FACILITY COMMUNICATION SERVICE

(75) Inventor: Nicholas K. Smith, Aberdeen, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/281,504

(22) Filed: Mar. 30, 1999

(51) Int. Cl.[7] .............................................. H04L 12/64
(52) U.S. Cl. ...................... 370/217; 370/352; 370/354
(58) Field of Search ................................ 370/352–356, 370/217, 218

(56) References Cited

U.S. PATENT DOCUMENTS

| | | |
|---|---|---|
| 4,802,199 A | 1/1989 | Lange et al. |
| 6,215,783 B1 * | 4/2001 | Neyman ..................... 370/353 |

* cited by examiner

Primary Examiner—Melvin Marcelo
(74) Attorney, Agent, or Firm—Birch, Stewart, Kolasch & Birch, LLP

(57) ABSTRACT

A system for establishing a virtual facility connection so that services provided by a main location private branch exchange are accessible by affiliated or remote locations via a concentrator, such as a relatively small on premises asynchronous transfer mode switch, that transmits/receives control signals to and from the private branch exchange over the Internet or a private data network. Terminals at affiliate or remote locations are connected to the main location PBX by way of a concentrator, an "always on" connection link, a public network and an Internet interface. For relatively small remote locations, virtual connections are established via the Internet, whereas for larger locations a physical connection is formed using the corporation's own private network. This system for tapping into the services provided by a main location PBX at a remote location terminal is less expensive than conventional private tie lines.

26 Claims, 4 Drawing Sheets

METHOD AND APPARATUS FOR PROVIDING VIRTUAL FACILITY COMMUNICATION SERVICE

FIELD OF THE INVENTION

The present invention relates to communication systems and, more particularly to a method and apparatus for establishing a virtual facility connection whereby services provided by a main location private branch exchange (PBX) are accessible by affiliated or remotely located terminals via a concentrator, such as a relatively small on premises asynchronous transmission mode (ATM) switch, that transmits/ receives control signals to or from the PBX over the Internet or a private data network.

BACKGROUND OF THE INVENTION

The communication needs (voice and data) of relatively large companies often require interconnecting private branch exchanges (PBXs) and/or key telephone systems (KTSs) at multiple locations. Previously, tapping into services of a main location PBX from affiliated or remotely located terminals required the use of permanent off premises extensions via private tie line connections. Private tie line extensions are disadvantageous in that they have limited capabilities and PBX networking is generally impracticable in that it is too expensive for relatively small affiliate or remote locations.

It is therefore desirable to develop a system to allow terminals in affiliate or remote locations to tap into the services and features, such as networking, watts lines, high functionality sets, data and messaging services, provided by a main location PBX without incurring the expense of private tie lines.

SUMMARY OF THE INVENTION

An exemplary embodiment of a system for accessing services of a main location private branch exchange by a terminal at a remote location, in accordance with the present invention, includes a concentrator for formatting a message transmitted from the remote terminal to the main location private branch exchange as an Internet message, and for unformatting an Internet formatted message transmitted from the main location private branch exchange to the remote terminal.

In another embodiment, a control message generated by the remote terminal is formatted by a concentrator as an Internet message when the remote terminal goes off hook. The formatted Internet message is then routed over a path including a connection link, a public network and an Internet interface. Thereafter, the formatted message is unformatted and transmitted to the main location private branch exchange. In a preferred embodiment the formatted message is unformatted using a server or software provided in the main location private branch.

The present invention is also directed to a method for providing access to services of a main location private branch exchange by a terminal at a remote location using the device as described above. A message transmitted from a remote terminal to the main location private branch exchange are formatted as an Internet message, and a message transmitted from the main location private branch exchange to the remote terminal is unformatted using a concentrator.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

In the system in accordance with the present invention, terminals in affiliate or remote locations can utilize the resources and services provided at a main location PBX without installing permanent private tie line connections by establishing virtual connections therebetween. "Virtual connections" are established over the Internet or, for larger locations, a physical connection may be established using the corporations's own private data network. In the former case, a virtual connection is established by accessing the Internet via digital subscriber lines (DSLs) or other connecting links having an "always on" capability, that is, a control path to the main location PBX is available at all times. The use of DSLs are advantageous in that they are "always on" and, therefore, control messages may be transmitted to any location without having to first establish a connection to the main location PBX. This allows terminals of affiliate or remote locations to establish a virtual connection with the main location so that voice and/or data terminals operate as if they were directly connected to the main location's voice PBX and data local area network (LAN).

Since the terminals in the remote location appear as if they were extensions on the main location PBX, each remote location terminal may access all of the services at the main location. For example, the remote location may access the following main location services:

a) outward least cost routing using the resource at the main location;

b) inward wide-area telephone service (INWATS) and direct inward dialing (DID) from the remote location through the main location;

c) complete PBX feature capability at the remote location as provided by the main location PBX, such as:

1) PBX station support (i.e. DEFINITY PBX system manufactured by Lucent Technologies, Inc.);

2) attendant and inward routing features extended to the remote location from the main location PBX;

3) access by the remote location to the main location's private net for originating and receiving private network calls;

4) intercom calls to any station on the main location and to any remote location using the main location's dialing plan;

5) call coverage provided to terminals at affiliate or remote locations of the main location, and vice versa;

6) extension of the main location's network dialing plan to the remote location;

7) extension of the main location's data services to the remote location;

8) extension of the main location's messaging services, voice mail and e-mail to the remote location; and 9) extension of computer/telephone interface (CTI) application services provided at the main location to the remote location.

Figure 1:
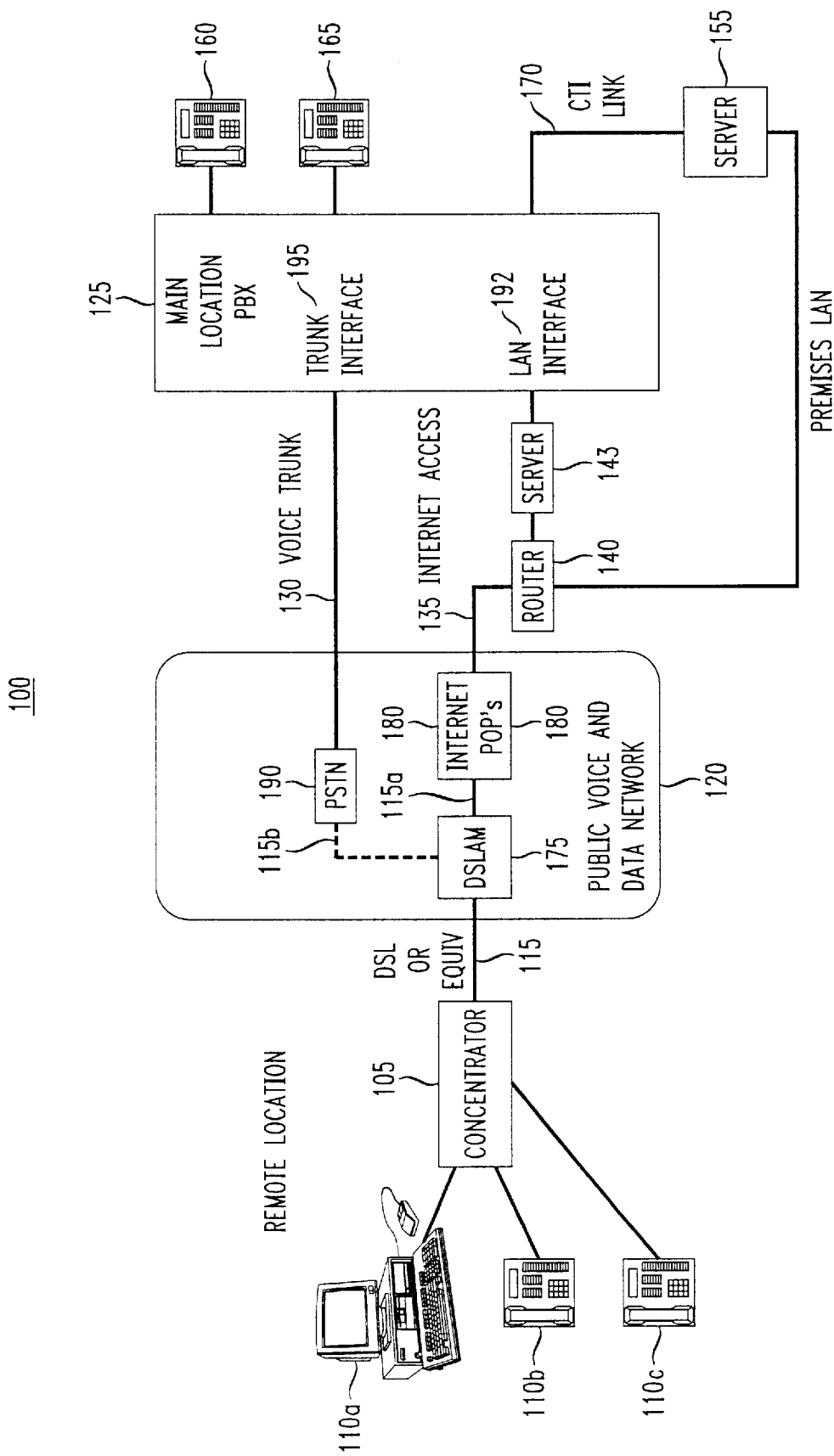
FIG. 1 is an example of a virtual configuration of the system for providing access by terminals at remote locations to features provided at a main location PBX in accordance with the present invention.

FIG. 1 is an example of a system 100 in accordance with the present invention wherein services at a main location PBX 125 may be accessed by terminals 110a, 110b, 110c at a remote or affiliate location via the Internet. In a preferred embodiment, the system in accordance with the present invention is shown and described as supporting both voice and data communication. It is, however, contemplated that the system in accordance with the invention could also be used for just data or voice communication. The system 100 includes a concentrator 105, preferably a voice and data concentrator. Any type of concentrator may be used so long as it is capable of passing control data and supports a connecting link, which provides "always on" point of presence so that it operates like an e-mail server. Concentrator 105 serves as a premises hub and off premises router. One or more voice and/or data terminals at an affiliate or remote location are connected to the concentrator. By way of example, FIG. 1 shows three remote location terminals including a data terminal 110a, such as a personal computer (PC) utilizing a 10baseT interface feature board, and two voice terminals 110b, 110c compatible with PBX and utilizing a feature board designed for a PBX interface. The remote location terminals are connected to a public network 120, preferably a voice and data public network, via a connecting link 115. Connecting link 115 has "always on" capabilities, such as a digital subscriber line (DSL), preferably an asynchronous digital subscriber line (ADSL). Other types of connecting links may include an integrated services digital network (ISDN) and a direct asynchronous transfer mode (ATM) link for relatively large systems.

The public voice and data network 120, in turn, is connected to a main location PBX 125, capable of supporting a remote concentrator. In addition, the public network 120 is connected to the Internet 135. By way of example, FIG. 1 shows two paths for transmitting data from the public network 120 to the main location PBX 125. Each path provides different services offered by the main location PBX. Although two paths are shown, any number of paths may be provided depending on the services offered by the main location PBX 125. The first path includes a server 143, and a LAN interface 192, while the second path includes a server 155, and a computer/telephone interface (CTI) link 170. Servers 143, 155 unformat the formatted Internet message, which is then transmitted to the main location PBX 125. Alternatively, the servers 143, 155 may be eliminated and the message may be unformatted using software in the main location PBX. Main location PBX 125 also has one or more ports connected to voice terminals 160, 165.

Real or virtual voice connections are established over the public network 120 as if the remote location terminals 110a, 110b, 110c were directly connected to the main location PBX 125. Thus, the terminals at the remote location are assigned numbers within the PBX dial plan of the main location PBX and essentially operate as extensions thereof. The remote location terminals 110a, 110b, 110c in FIG. 1 are relatively small in size and thus, do not have an established physical point of presence at the main location PBX 125. Instead, a virtual connection is created over the Internet between the terminals at the affiliate or remote locations and main location PBX of the system. Information, such as control signals for controlling the remote location 110a, and voice and data signals sent, for example, to the voice and data terminals 110b, 110c, from the main location PBX 125, are transmitted via the Internet 135.

Public network 120 preferably includes a digital subscriber line access multiplexer (DSLAM) 175 and an Internet point of presence (POP) 180 connected in series between the connecting link 115 and the Internet 135. Signaling of the remote site 110a may be established in a higher level message, which includes the address of the remote location site, that is passed to software for formatting the control message as an Internet message and transmitting the formatted message over the Internet. Because these messages are at a fairly low level and the human interface depends on their timely transmission, they are preferably transmitted at a relatively high priority. For instance, these messages may be sent over the CTI link 170, the server 155, and the router 140, or alternatively transmitted via the LAN interface 192, the server 143 and the router 140. Relatively small virtual connectivity configurations, as shown in FIG. 1, are suitable, for example, in single line home offices and relatively small-of-large remote location sites currently served by relatively small key systems.

In the configuration described above, the voice and control portions of the message are transmitted from the DSLAM 175 to the Internet POP 180. If the connecting link is an ADSL, then in order to accommodate emergency situations wherein transmission over the Internet is not possible, the formatted message transmitted to the DSLAM 175 can be split by a plain old telephone splitter (PS) (not shown) into a voice portion and a control portion. The voice portion is transmitted to the main location PBX 125 via connection 115b (as represented by the dotted line), a public switched telephone network 190, a voice trunk 130, and trunk interface 195, while the control portion of the message is transmitted to the Internet via connection 115a and the Internet POP 180. In this alternative embodiment, the additional analog connection 115b is reserved as an Internet failure back-up, for instance, when the modem is not working properly or the connections are tied up and cannot be readily established. Furthermore, the quality of the voice data being transmitted over the Internet from the main location PBX to the remote location may be rather poor. The quality of the voice data received at the remote location may be improved by transmitting voice data via the PSTN 190 and a PSTN interface to the concentrator 105.

Figure 2:
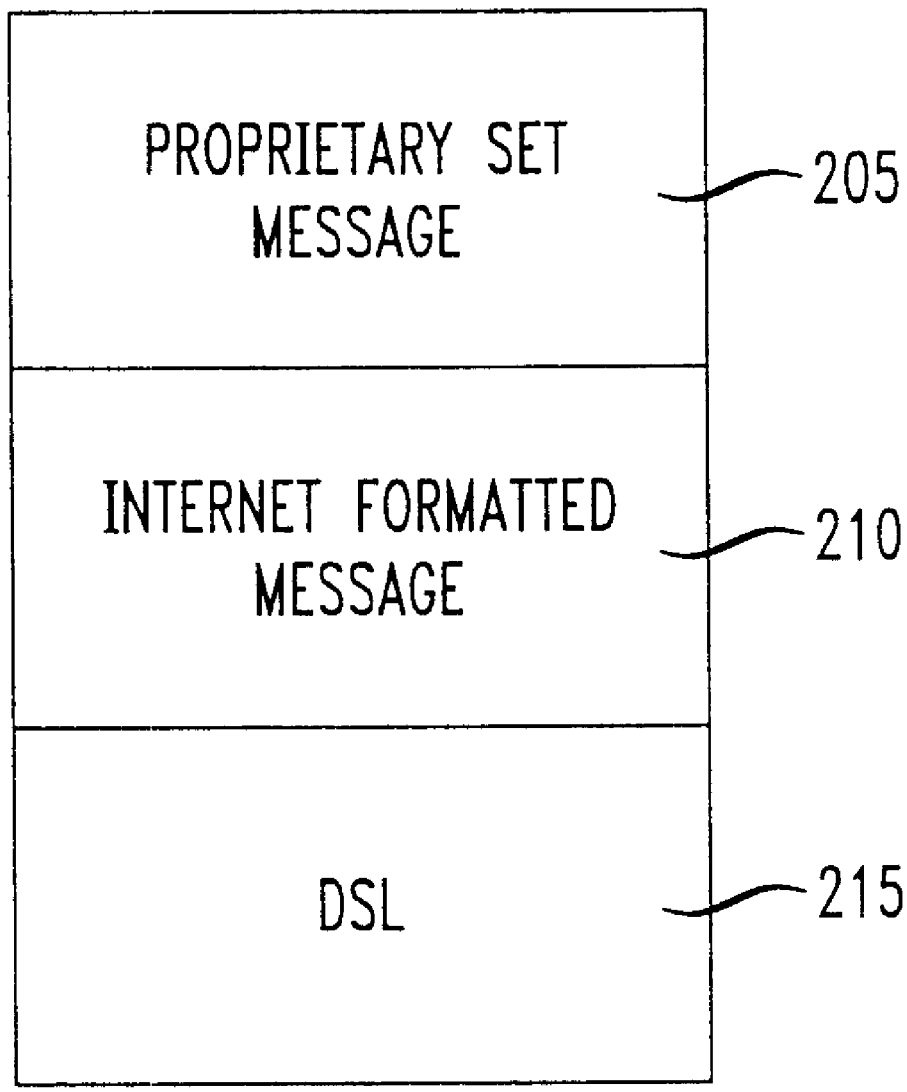
FIG. 2 is a protocol stack for the concentrator in FIG. 1.

FIG. 2 is a configuration of the stacking protocol 200 for the concentrator 105 in FIG. 1. A proprietary set message 205, such as a digital control protocol (DCP) developed by Lucent Technologies, generated by the remote terminal, is received at the concentrator. The concentrator converts the proprietary message to a formatted Internet message 210 which is then transmitted over the DSL 215.

Figure 3:
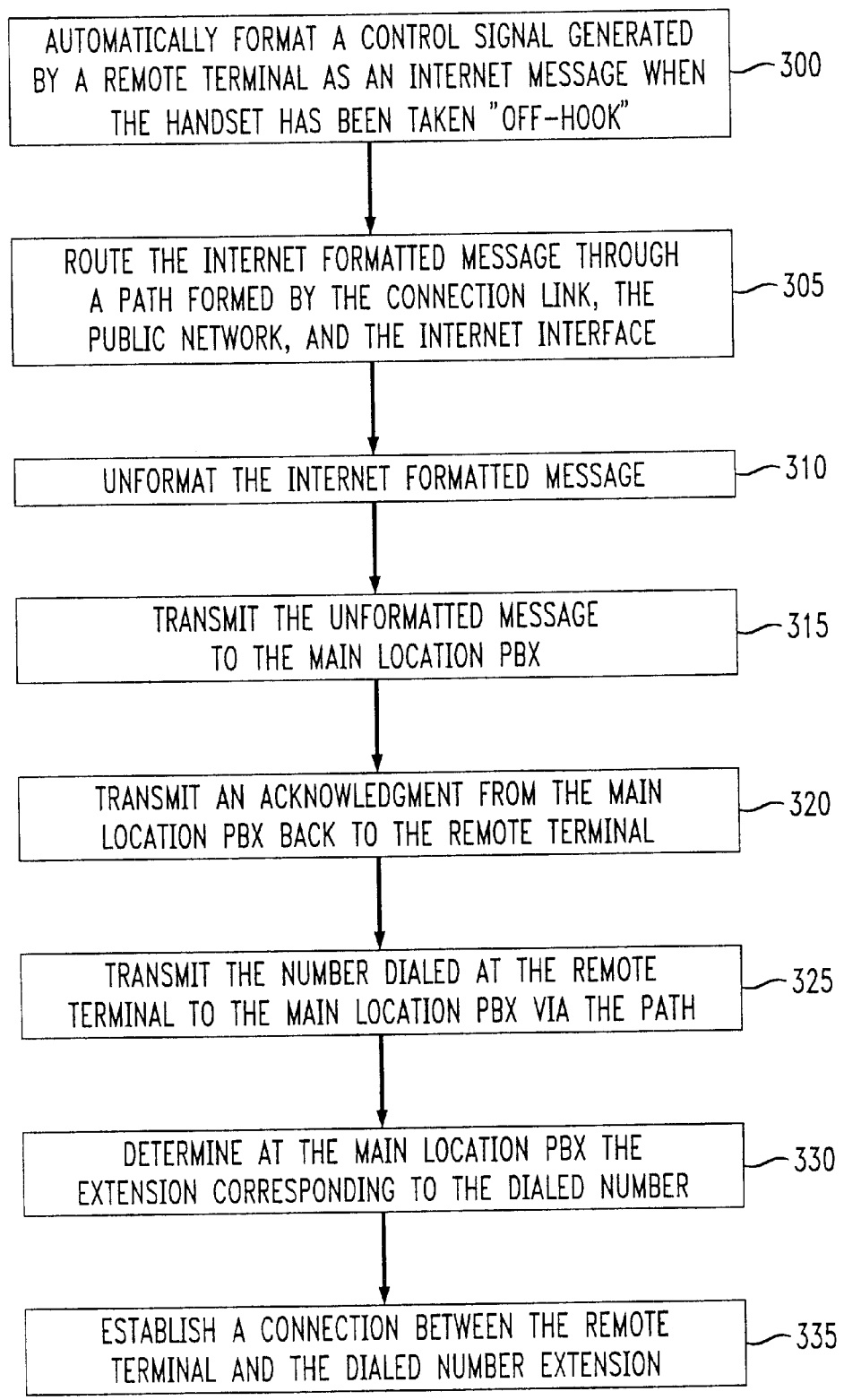
FIG. 3 is an example of a flow chart of the operation of the system in FIG. 1 for providing access by terminals at remote locations to features provided at a main location PBX in accordance with the present invention.

In operation, two scenarios are possible, voice or audio calls either originate or terminate at the remote location terminal. The communication path is the same regardless of from where the calls originate and thus, only the former case will be described, wherein one of the voice terminals at the remote location originates a call to a terminal of the main location PBX. It should be noted that, although the invention is described as establishing a call to a terminal of the main location PBX, calls may also be established between terminals at the same remote location or at different remote locations. FIG. 3 is a flow chart generally describing this process. One of the voice terminals, such as 10b, originates a call, that is, the handset is taken "off-hook". In step 300, the concentrator detects that the handset has been taken "off-hook" and automatically formats the control signal as an Internet message for routing to the main location PBX 125 over the Internet 135. Concentrator 105, preferably includes different modules or cards representing different connection packages. Each card or module in the concentrator packages the message for different types of networks and network connections. The formatted Internet message is routed in step 305 over a path formed by the connection link 115, the public network 120, and the Internet 135. In particular, the path in the public network 120 is through the DSLAM 175 and the Internet POP 180. Then, in step 310, the Internet message is unformatted and transmitted to the main location PBX in step 315. In step 320, the main location PBX typically transmits an acknowledgment back to the remote location terminal that causes a prime line preference to be selected and an associated prime line button on the remote location terminal to be illuminated. The remote location terminal dials a number which is encapsulated. As is well known in the field of telephony, each pressed digit may be represented by separate messages or all of the digits may be encapsulated into a single message. The encapsulated message is then transmitted, in step 325, back to the main location PBX 125 via the same path described above used to initiate the connection. In steps 330 and 335, the main location PBX processes the digits and routes the call to the appropriate extension corresponding to the dialed number and the connection is completed when the handset at the associated terminal, for example voice terminal 160, is taken "off-hook".

The connection is now complete and voice or audio data may be transmitted between the originating remote location terminal and the recipient terminal at the main location PBX. Voice or audio data from terminal 110*b* is formatted into an Internet message by the concentrator 105 and transmitted over the connecting link 115, the public network 120, and the Internet 135. The encoded Internet message is unformatted by one of the servers 143 or 155 and forwarded to the main location PBX 125. Alternatively, the packets may be unformatted using software in the main location PBX. Thereafter, the calls are routed from the main location PBX 125 to the recipient terminal. On the other hand, voice data from the recipient terminal is transmitted to the main location PBX 125 and then the message is formatted into an Internet message, for example using real time protocol (RTP). The formatted Internet message is sent by way of the router 140, the Internet 135, the public network 120, and the connecting link 115 to the concentrator 105. Concentrator 105 unformats the formatted message and transmits the decoded message to the remote terminal 110*b*.

Figure 4:
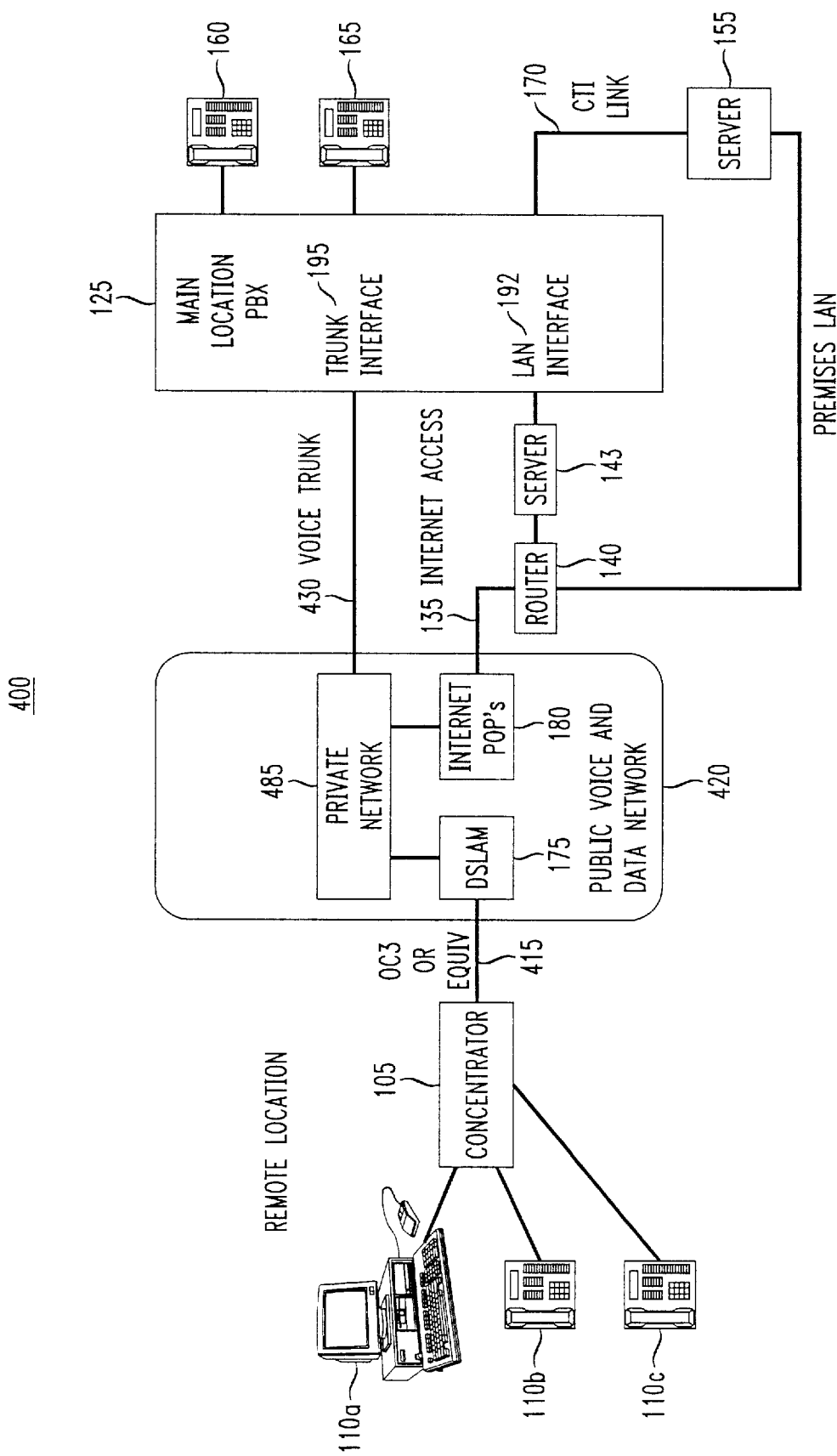
FIG. 4 is an example of a physical configuration of the system for providing access by terminals at remote locations to features provided at a main location PBX in accordance with the present invention.

FIG. 4 is a configuration of the system in accordance with the present invention with the public network 420 physically connected to the data network of the main location PBX. This alternate configuration is suitable for larger virtual connectivity configurations serving other locations that require resource sharing. The system in FIG. 4 is similar to that shown in FIG. 1, with the following exceptions: 1) the DSLAM 175 and the Internet POP 180 are each connected to a private network 485, and 2) the connecting link 415 may be an OC3 interface or some other type of private network connection. In this physical configuration, control signals are transmitted by way of the private network 485 from the main location PBX 125 to the remote location. Voice traffic is encoded using conventional ATM voice protocol, such as that described in the ATM Forum Specification 0083. "Voice and Telephone over ATM to the desktop". Data traffic may be routed to a server on the private network for resource access or may access the Internet either through a POP on the private network or through the main locations PBX resources.

It is the purpose of the device in accordance with the present invention to provide call scenarios at remote locations as if the voice and data signals originated at the main location PBX without regard to or indication of the fact that the terminals are not part of the main location. Calls originating at the remote terminals are processed the same way as calls at the main location PBX. For example, if the main location PBX uses real or automated attendant service, then the remote location's calls are handled by the attendant. If the main location has DID, the terminals at the remote locations are likewise assigned DID numbers as part of the DID plan at the main location. Similarly, calls to the remote location receive the same call coverage as provided at the main location, including the use of its voice mail system.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A system for accessing services of a main location private branch exchange by a terminal at a remote location, comprising:

a concentrator at said remote location for formatting a message transmitted from said remote terminal to said main location private branch exchange as an Internet message; and a public network for connecting the message from the concentrator to the main location private branch exchange via a LAN interface; wherein in the event of an Internet failure, the concentrator transmits an analog portion of said message directly to the main location branch exchange.

2. A system in accordance with claim 1, wherein said message is a control message and said concentrator automatically formats said control message when said remote terminal goes off hook.

3. A system for accessing services of a main location private branch exchange by a terminal at a remote location, comprising:

a concentrator at said remote location for unformatting an Internet formatted message transmitted from said main location private branch exchange to said remote terminal; and a public network for connecting the message from the concentrator to the main location private branch exchange via a LAN interface;

wherein in the event of an Internet failure, the concentrator receives an analog portion of said message directly from the main location branch exchange.

4. A system for accessing services of a main location private branch exchange by a terminal at a remote location, comprising:

a concentrator at said remote location for formatting an Internet provider message, said concentrator being connected to said remote terminal;

a public network;

a connection link connecting said concentrator to said public network; and an Internet interface connecting said pubic network to said main location private branch exchange via a LAN interface, wherein in the event of an Internet failure, the concentrator transmits an analog portion of said message directly to the main location branch exchange.

5. A system in accordance with claim 4, wherein said main location private branch exchange includes software for unformatting the Internet provider message.

6. A system in accordance with claim 4, further comprising a router connected between said Internet interface and said main location private branch exchange.

7. A system in accordance with claim 6, further comprising a server connected between said router and said main location private branch exchange for unformatting the Internet provider message.

8. A system in accordance with claim 7, further comprising a computer/telephone interface link for connecting said server to said main location private branch exchange.

9. A system in accordance with claim 4, wherein said public network is a voice and data network.

10. A system in accordance with claim 4, wherein said connection link is of the "always on" type.

11. A system in accordance with claim 10, wherein said connection interface is a digital subscriber line having a digital output and an analog output.

12. A system in accordance with claim 11, wherein said public network comprises:

a digital subscriber line access multiplexer having an input connected to the digital output of said digital subscriber line and an output; and an Internet point of presence connected between the output of said digital subscriber line access multiplexer and said Internet interface.

13. A system in accordance with claim 12, wherein said public data network further comprises a public switch telephone network connected to the analog output of said digital subscriber line.

14. A system in accordance with claim 13, wherein said public data network further comprises a private network.

15. A system in accordance with claim 14, further comprising voice and data trunks for connecting said public switch telephone network and said private network to said main location private branch exchange.

16. A system in accordance with claim 10, wherein said connection link is an OC3 interface.

17. A system in accordance with claim 16, wherein said public data network comprises:

a digital subscriber line access multiplexer having an input connected to said OC3 link;

a private data network connected to said digital subscriber line access multiplexer; and an Internet point of presence connected between said private data network and said Internet interface.

18. A system in accordance with claim 17, wherein said public data network further comprises a public switched telephone network.

19. A system in accordance with claim 18, further comprising voice and data trunks for connecting said public switched telephone network and said private network to said main location private branch exchange.

20. A method for accessing service of a main location private branch exchange by a terminal at a remote location, comprising:

formatting a message transmitted from said remote terminal to said main location private branch exchange via a LAN interface as an Internet message using a concentrator, wherein in the event of an Internet failure, transmitting an analog portion of said message from said remote terminal directly to the main location branch exchange via an analog connection.

21. A method for accessing service of a main location private branch exchange by a terminal at a remote location, comprising:

unformatting an Internet message transmitted by said main location private branch exchange via a LAN interface to said remote terminal using a concentrator, wherein in the event of an Internet failure, transmitting an analog portion of said message from said main location branch exchange directly to said remote terminal via an analog connection.

22. A method for accessing services of a main location private branch exchange by a terminal at a remote location, comprising:

(a) formatting an Internet provider message at a concentrator at said remote location when said remote terminal goes off hook;

(b) routing the formatted Internet provider message over a path including a connection link, a public network and an Internet interface;

(c) unformatting the Internet provider message; and (d) transmitting the unformatted Internet provider message to the main location private branch exchange via a LAN interface, wherein in the event of an Internet failure, transmitting an analog portion of said message from said remote terminal directly to the main location branch exchange via an analog connection.

23. A method in accordance with claim 22, further comprising transmitting an acknowledgment signal from the main location private branch exchange to said remote terminal.

24. A method in accordance with claim 22, wherein said unformatting step (c) comprises unformatting the Internet provider message using software at said main location private branch exchange.

25. A method in accordance with claim 22, wherein said unformatting step (c) comprises unformatting the Internet provider message using a server connected between said Internet interface and said main location public branch exchange.

26. The system for accessing services of a main location private branch exchange by a terminal at a remote location according to claim 4, wherein said connection link is provided with a splitter for enabling said analog portion of said message to be optionally transmitted directly to the main location branch exchange via an analog connection.

\* \* \* \* \*